July 8, 1930.  O. A. KRENKE  1,769,926
RETARDING DEVICE
Filed Nov. 10, 1927
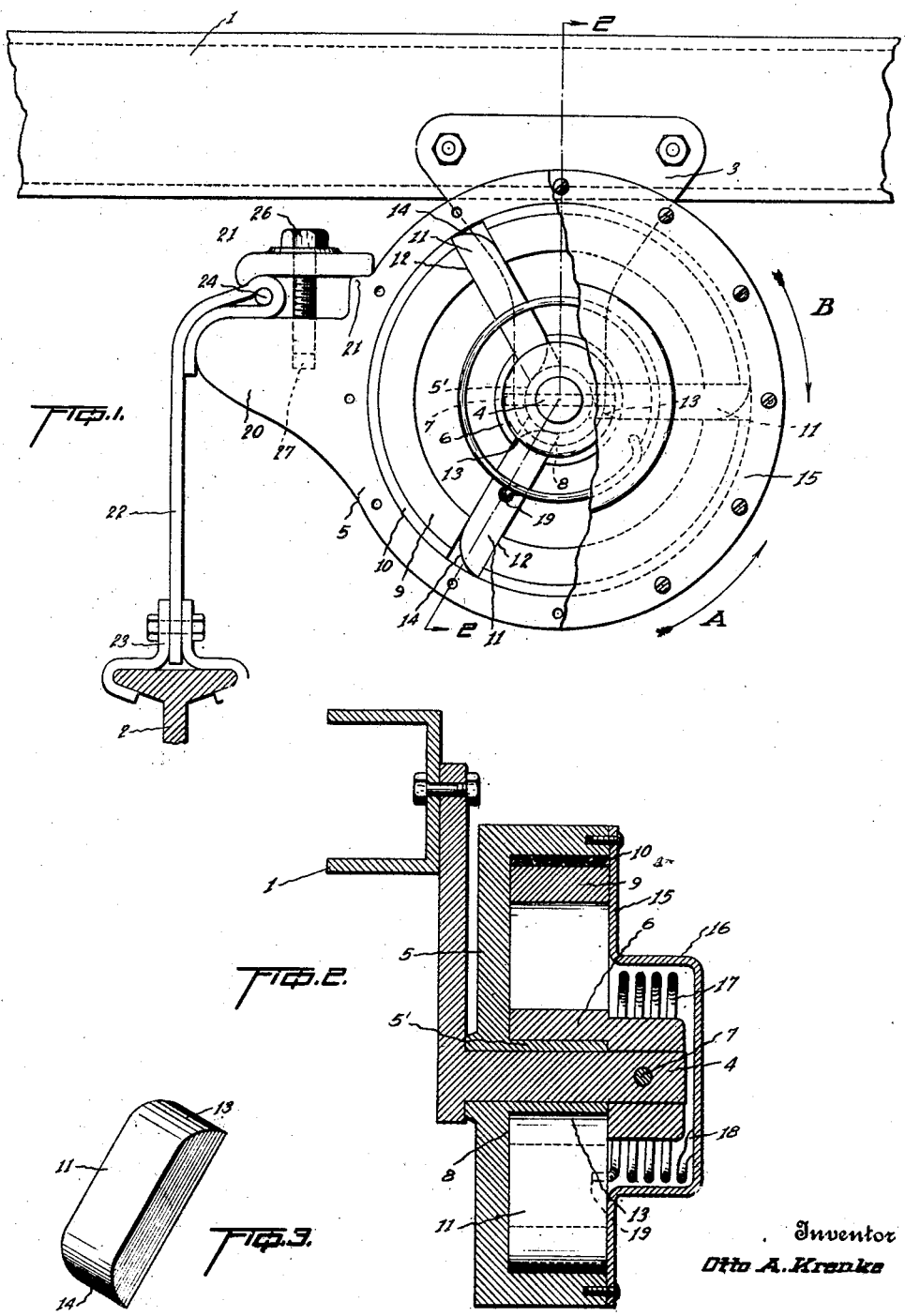
Inventor
Otto A. Krenke
By
Attorney Patented July 8, 1930

1,769,926

UNITED STATES PATENT OFFICE

OTTO A. KRENKE, OF PORT HURON, MICHIGAN, ASSIGNOR OF ONE-HALF TO ERNEST L. POWERS, OF PORT HURON, MICHIGAN

RETARDING DEVICE

Application filed November 10, 1927. Serial No. 232,259.

The present invention pertains to a novel retarding device designed particularly for use as a shock absorber, operating on a braking principle, in connection with motor vehicles.

The principal object of the invention is to provide a device of this character constructed of a small number of simple and inexpensive parts and wherein the retarding action is accomplished by the frictional engagement of brake shoes with a rotatable casing rather than by friction between a strap and the casing as in present shock absorbers.

This object is accomplished by constructing the device essentially of a rotatable casing, a fixed hub, brake shoes engaging the inner wall of the casing, and toggle members seated in the hub and received between the brake shoes. The mounting of the toggle members in the hub is such as to tilt these members when the casing is turned in a given direction whereby to force the shoes against the casing. In the opposite rotation of the casing, as during the recoil of a spring embodied in the device, the peculiar mounting of the toggle members in the hub permits the casing to ride idly over the brake shoes.

The invention is fully disclosed by way of example in the following description and in the accompanying drawing, in which—

Figure 1 is a vertical longitudinal section of the device mounted on a motor vehicle;

Fig. 2 is a transverse vertical section on the line 2—2 of Figure 1; and

Fig. 3 is a perspective view of one of the toggle members.

Reference to these views will now be made by use of like characters which are employed to designate corresponding parts throughout.

The numeral 1 indicates the chassis of a motor vehicle, and the member 2 is an axle. To the chassis is secured a bracket 3 from which extends an integral horizontal spindle 4. On the spindle is mounted a rotatable drum or casing 5 having a hub 5' which affords a bearing for the spindle. This hub is surrounded by another hub member 6 which is fixed to the spindle by a pin 7 and thereby held against rotation. The hub is formed with at least one square radial notch 8, but three such notches are shown in the present embodiment. As will appear from the subsequent description of the operation of the device, any number of such notches and associated assemblies may be used.

The inner circumferential wall of the casing 5 is engaged by a number of spaced brake shoes each comprising a metal segment 9 and a friction facing 10 of leather or other fibrous material secured thereto for frictional contact with said inner wall. Toggle members 11 corresponding in number to the brake shoes, unless only one such member and two shoes are used, have their inner ends seated in the notches 8 and their outer ends received between mutually adjacent brake shoes. The inner end of each shoe is formed to retain a sharp corner 12 which presents a radial face 12 in surface contact with the adjacent lateral or radial wall of the corresponding notch 8. The other corner or edge within the hub is rounded at 13 to destroy the surface contact between the toggle member and the other lateral or radial wall of the notch. The outer end 14 of the toggle member may be similarly shaped for facility in assembling and reversibility in the braking direction of the device.

A cover 15 is secured over the open side of the casing 5 and is formed with a depression 16 for the projecting end of the hub and spindle. In this depression is mounted a coil spring 17 having one end anchored to the cover as at 18 and the other end 19 anchored in one of the toggle members.

The casing 5 is formed with a horizontally extending ear 20 and a shoulder 21 above the same. A strap 22 has one end fixed to the axle 2 by means of a clamp 23, and the other end wound over a pin 24 laid upon the ear 20. A clamp 25 is supported on the shoulder 21 and the doubled part of the strap, and the latter is firmly secured to the ear by means of a bolt 26 passed through the clamp 25 and threaded into an aperture 27 in the ear.

In the operation of the device, a separating movement between the chassis 1 and axle 2 obviously causes the casing 5 to turn in the direction of the arrow A, while the hub 6 remains stationary at all times. The friction between the casing and the brake shoes 9 tends to turn the latter in the same direction, whereby the outer ends of the toggle members are imparted a force acting in the same direction. The rounded inner corners 13 of the toggle members remove the resistance to such movement of the toggle members, whereupon the latter are tilted in their fixed sockets 8, and in the general direction of rotation of the casing. This tilting movement results in a toggle or prying action between the brake shoes, tending to enlarge the spaces between the shoes and consequently to compress the shoes at both ends. The compressive action of the toggle members on the ends of the shoes forces the latter outwardly to bring them into firm frictional engagement with the inner wall of the casing 5. The firmness of this engagement increases with the pull separating the members 1 and 2, but the force tending to turn the casing in the direction of the arrow A is sufficient to cause some slippage between the casing and the shoes, so that the shock is actually cushioned rather than abruptly resisted.

At the same time, the spring 17 winds, since the end 19 thereof is fixed in so far as circumferential movement is concerned. On the recoil of the spring when the separating movement between the members 1 and 2 has terminated, the end 19 remains fixed and the end 18 consequently turns the casing in the direction of the arrow B. Rotation of the casing in this direction tends to turn the outer ends of the toggle members 11 in the same direction and to bring the flat face 12 thereof into surface engagement with the adjacent lateral or radial wall of the corresponding notch 8. This surface engagement prevents the toggle members from being moved out of a radial position, as a result of which there is no displacement or spreading of the brake shoes as when the toggle members are tilted, and consequently no obstruction to the turning of the casing 5 in the direction of the arrow B under the action of the spring 17.

In applying the device to a vehicle, it is not necessary to distort the body springs as in the application of shock absorbers of present construction. Consequently, there is no strain on the body springs in their normal condition, and they are therefore in a condition to function as intended.

The active or braking direction of the device may be reversed by reversing the toggle members so that the flat faces 12 thereof are presented in the opposite direction. Another means of reversal is to fix the casing 5 against rotation and connect the strap to the spindle 4 in a manner to cause the latter to turn. It will also be apparent that this braking action may be used for general purposes rather than for a shock absorber exclusively, and that the construction may be modified in the number of brake shoes and toggle members.

Although a specific embodiment of the invention has been illustrated and described, it will be understood that various alterations in the details of construction may be made without departing from the scope of the invention as indicated by the appended claims.

What I claim is:—

1. In a retarding device, a hub member, a casing member, one of said members being fixed and the other rotatable relatively thereto, brake shoes engaging the inner wall of said casing, toggle members each having one end seated in said hub and the other end received between mutually adjacent shoes, the end in the fixed member being mounted for tilting on rotation of the rotatable member in one direction, whereby to force the shoes against the casing, and a spring connection between the casing and a relatively fixed member.

2. In a retarding device, a fixed hub, a rotatable casing, brake shoes engaging the inner wall of said casing, toggle members each having one end seated in said hub and the other end received between mutually adjacent shoes, the end in the hub being mounted for tilting on rotation of said casing in one direction, whereby to force the shoes against the casing, and a spring connection between the casing and a relatively fixed member, said spring being positioned to wind in the braking direction of the casing.

3. In a retarding device, a fixed hub, a rotatable casing, brake shoes engaging the inner wall of said casing, toggle members each having one end seated in said hub and the other end received between mutually adjacent shoes, the end in the hub being mounted for tilting on rotation of said casing in one direction, whereby to force the shoes against the casing, and a spring connection between the casing and one of said toggle members.

4. In a retarding device, a fixed hub having square notches, a rotatable casing, brake shoes engaging the inner wall of said casing, toggle members each having one end seated in said hub and the other end received between mutually adjacent shoes, the end in the hub having a flat face adapted for superficial surface contact with one of the lateral walls of the corresponding notch and having a rounded corner to provide clearance from the wall opposite said lateral wall, whereby to permit tilting of said toggle members on rotation of the casing in one direction, and a spring connection between said casing and one of the toggle members.

5. In a retarding device, a fixed hub having square notches, a rotatable casing, brake shoes engaging the inner wall of said casing, toggle members each having one end seated in said hub and the other end received between mutually adjacent shoes, the end in the tub having a flat face adapted for superficial surface contact with one of the lateral walls of the corresponding notch and having a rounded corner to provide clearance from the wall opposite said lateral wall, whereby to permit tilting of said toggle members on rotation of the casing in one direction, and a spring connection between said casing and one of the toggle members, said spring being positioned to wind in the braking direction of the casing.

In testimony whereof I affix my signature.

OTTO A. KRENKE.